Sept. 17, 1957 R. P. EVANS 2,806,990
REGULATOR FOR AN ALTERNATOR
Filed Aug. 21, 1953
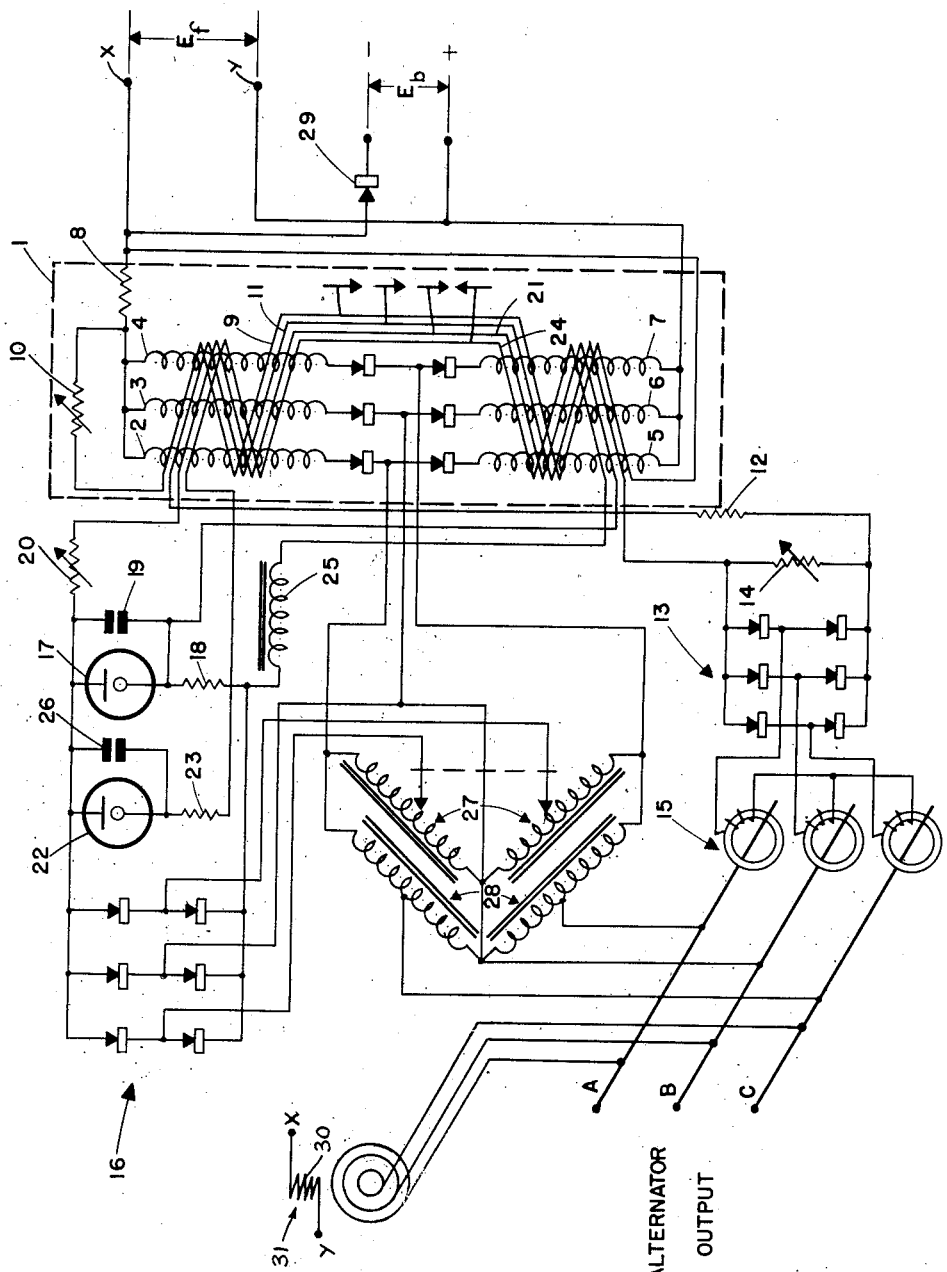
INVENTOR.
ROBERT P. EVANS
BY
William R. Lane
ATTORNEY

United States Patent Office 2,806,990
Patented Sept. 17, 1957

2,806,990
REGULATOR FOR AN ALTERNATOR

Robert P. Evans, Bell, Calif., assignor to North American Aviation, Inc.

Application August 21, 1953, Serial No. 375,726

9 Claims. (Cl. 322—25)

This invention is an exciter which regulates an alternator in accordance with alternator output current and voltage.

A quick response to transient loads is a feature of this device. It incorporates a magnetic amplifier as an exciter which responds to various load conditions of the alternator and feeds back a compensating voltage to the alternator field. In design, reliability is achieved by the use of magnetic amplifier circuitry and diodes, and by avoiding the use of amplifying tubes. Such construction requires a minimum of maintenance and requires no filament warmup time.

In general, the magnetic amplifier responds to increases in alternator load current so as to strengthen the alternator field, and, further, it responds to changes in alternator voltages again to strengthen or weaken the alternator field to correct the alternator voltage. The system provides a desired alternator characteristic curve of output voltage versus current so that by preadjustment the output voltage will increase, decrease, or remain constant between the limits of no load and full load. The system provides for positive control of output alternator voltage. Further, it holds the alternator output voltage to the proper value regardless of changes in power factor.

It is an object of this invention to regulate an alternator in accordance with its output.

It is another object of this invention to provide a reliable, regulating exciter requiring a minimum of maintenance.

A further object of this invention is to provide a regulator having a minimum response time.

Other objects of invention will become apparent from the following description taken in connection with the accompanying drawing which is a schematic diagram of the invention.

Referring to the drawing, three-phase bridge, D.-C. output, self-feedback magnetic amplifier indicated within dotted lines 1, having six load windings 2, 3, 4, 5, 6, and 7 furnishes a rectified voltage, $E_f$, to an alternator field coil 30 of alternator 31 through resistance 8 through lines X, Y. The voltage across resistance 8, proportional to the output field current, is positively fed back to control winding 9 of the magnetic amplifier and the current is adjustable by variable series resistance 10. This positive feedback according to field current serves to increase the sensitivity of the magnetic amplifier to current in the control windings.

Control winding 11 receives current through series resistance 12 from three-phase, bridge rectifier 13 which is shunted by variable resistance 14. The input to rectifier 13 is obtained from three-phase current transformer 15, which, in turn, receives its input from the alternator output load lines A, B, and C. Control winding 11, therefore, receives a current flow dependent on the current flowing to a load from the alternator. This winding 11 provides a large portion of the net control of the magnetic amplifier so that greater loads on the alternator automatically incur greater field currents, strengthening the field. Lesser loads likewise result in a lesser field strength.

Three-phase, bridge rectifier 16 provides power to operate constant voltage gas tube 17 which is in series with resistance 18. Gas tube 17 is paralleled by capacitance 19 and also by resistance 20 in series with control winding 21. Bridge rectifier 16 also furnishes power to constant voltage gas tube 22 in series with resistance 23, control winding 24, and magnetic choke 25. Constant voltage gas tube 22 is in parallel with capacitance 26. Capacitors 19 and 26 are for the purpose of by-passing various harmonics induced in windings 21 and 24 of magnetic amplifier 1. Magnetic choke 25 serves to smooth out fluctuations in current through control winding 24. The three-phase, bridge rectifier 16 receives power from variable open delta transformer 27 which, in turn, receive power from the alternator output directly, or through open delta step up transformer 28 which is connected to the alternator output. It can be seen that tube 17 is in parallel with control winding 21 while tube 22 is in series with control winding 24. The current flowing in control winding 21, as connected, is a relatively constant current and does not change with variations in alternator output. However any slight change in alternator output voltage causes a large change in current through voltages gas tube 22 and, consequently, through control winding 24. This control is very sensitive, therefore, to changes in alternator output voltage. Control winding 24 is connected so that its ampere-turns "buck" the ampere-turns of the control windings 9, 11, and 21, that is, an increase in current flow in control winding 24 produces a net control in magnetic amplifier 1 which tends to reduce the alternator field current. Direction arrows indicate relative directions of magnetization by current in the control windings. By the combination of constant voltage gas tubes 17 and 22, a positive control of output voltage of the alternator is attained.

It is seen that at no load with no current flowing from the alternator, control winding 11 would have no regulating effect. The alternator output voltage is then regulated, however, by the constant ampere-turns in control winding 21 being exceeded by the "bucking" ampere-turns in control winding 24. The amount of field current furnished to the alternator and, thus, its output voltage, is determined by the extent to which the ampere-turns in winding 24 exceeds the ampere-turns in winding 21. This is readily adjustable by changing the voltage input to rectified 16 by varying open delta 27.

If a load were suddenly changed from resistive to reactive with the current remaining the same, it can be seen that control winding 11 would reflect no change to the alternator field because it is responsive only to changes in current. However, constant voltage gas tube 22 would readily sense any change in voltage and the ensuing current flow in control winding 24 would provide the necessary change in the alternator field current and changes in load voltage regardless of varying power factor. It is found that better stabilization is acquired by the utilization of two opposing tubes in the manner described and allowing the effect of one to "buck" and exceed the effect of the other. An auxiliary votlage $E_b$ provides an initial field excitation at the commencement of alternator rotation. When the magnetic amplifier begins control of the alternator field, diode 29 prevents current from flowing through the auxiliary voltage supply.

The magnetic amplifier derives its power from the alternator output or any other convenient source through the open delta step-up transformer 28. The magnetic amplifier supplies the entire field current for the alternator. In determining the amount of control to be exercised by each influencing factor (load current and voltage), it is desirable that a small change in alternator output current creates a substantial change in the output of the magnetic amplifier to the alternator field. Over the useful load range, the change in current (ampere-turns) in winding 11 provides most of the correction. Although the ampere-turns provided by winding 24 may exceed those of winding 11, there is not so large a variation of current (ampere-turns) in winding 24. The combination of reference gas tube 17 and control gas tube 22 is an error detection device which provides sufficient control of alternator voltage to correct for the nonlinearities of the magnetic amplifier and variations in load power factor.

Although the invention has been described and illustrated in detail, it is to be clearly understood that the same is by way of illustration and example only and is not to be taken by way of limitation, the spirit and scope of this invention being limited only by the terms of the appended claims.

I claim:

1. As a regulator for an alternator, a magnetic amplifier having a first, second, and third control winding for controlling the field strength of said alternator, current transforming means in the output of said alternator, first rectifying means in the output of said current transforming means, said first control winding upon said magnetic amplifier connected to receive power from said first rectifying means, voltage transforming means in the output of said alternator, second rectifying means in the output of said voltage transforming means, a first constant voltage dropping means connected to receive power from said second rectifying means, said second control winding of said magnetic amplifier being connected to receive constant voltage from said first constant voltage dropping means, a second constant voltage dropping means connected in series with said third control winding of said magnetic amplifier across said second rectifying means.

2. The combination recited in claim 1 wherein said third control winding is disposed to buck said second control winding and the magnetic amplifier control provided by said third control winding generally exceeding in control said second control winding.

3. The combination recited in claim 1 wherein is included upon said magnetic amplifier a fourth control winding connected to receive a voltage dependent on the output current of said magnetic amplifier, whereby said alternator is further regulated as a function of its own field strength.

4. As a regulator for an alternator, a magnetic amplifier connected to control the exciting current of said alternator, a first control winding upon said magnetic amplifier connected to receive a current proportional to the load current of said alternator, a second control winding upon said magnetic amplifier connected to receive a current proportional to an unvarying reference voltage, a third control winding upon said magnetic amplifier connected to receive a current proportional to the difference between the output voltage of said alternator and a constant voltage, said third winding adapted to buck and normally exceed the control exercised by said second control winding.

5. The combination recited in claim 4 wherein is included a fourth control winding upon said magnetic amplifier connected to receive a voltage proportional to the exciting current received by said alternator.

6. In combination, a magnetic amplifier, a current transformer disposed in a supply line, means for rectifying the output of said current transformer, a first control winding upon said magnetic amplifier connected to receive the output of said rectifying means, means for varying the current flow in said first control winding, a voltage transformer disposed in the same supply line as said current transformer, means for rectifying the output of said voltage transformer, a first voltage regulator tube connected to receive the output of said voltage rectifying means, a second control winding connected to receive the voltage drop across said first voltage regulator tube, a second voltage regulator tube, a third control winding upon said magnetic amplifier connected to receive the current through said second voltage regulator tube, a magnetic choke in series with said second voltage regulator tube and said third control winding, a resistor in the output of said magnetic amplifier, a fourth control winding upon said magnetic amplifier, a variable resistor in series with said fourth control winding, connected across said resistor.

7. The combination recited in claim 6 wherein the change of current in said first control winding provides the major change of output of said magnetic amplifier and said third control winding is operated to oppose and generally exceed the control of said second control winding.

8. An exciter for an alternator comprising a magnetic amplifier having a plurality of control windings, the first control winding of said amplifier connected to receive a current flow proportional to the load current of said alternator, the second control winding having an unvarying reference voltage impressed across it, the third control winding connected to receive a current which varies with the variance in output voltage of said alternator from a reference voltage, said third control winding connected to buck both first and second control windings, wherein said first control winding has the greater change of ampere-turns over the useful alternator load range.

9. As a regulator for an alternator, a magnetic amplifier controlling the output of said alternator, means for controlling the output of said magnetic amplifier in accordance with the load current of said alternator, a first constant voltage dropping means, a first control winding on said magnetic amplifier connected in series with said constant voltage dropping means across the output of said alternator, a second constant voltage dropping means, a second control winding on said magnetic amplifier connected in parallel with said second constant voltage dropping means across at least a portion of the output of said alternator, said second control winding disposed in said magnetic amplifier so as to magnetically buck the magnetic field of said first control winding.

References Cited in the file of this patent

UNITED STATES PATENTS

| | | |
|---|---|---|
| 2,184,371 | Thompson | Dec. 26, 1939 |
| 2,456,938 | Harder | Dec. 21, 1948 |
| 2,477,988 | Krabbe | Aug. 2, 1949 |
| 2,477,990 | Lamm | Aug. 2, 1949 |
| 2,677,097 | Carleton | Apr. 27, 1954 |
| 2,709,776 | Evans et al. | May 31, 1955 |